UNITED STATES PATENT OFFICE 1,957,540

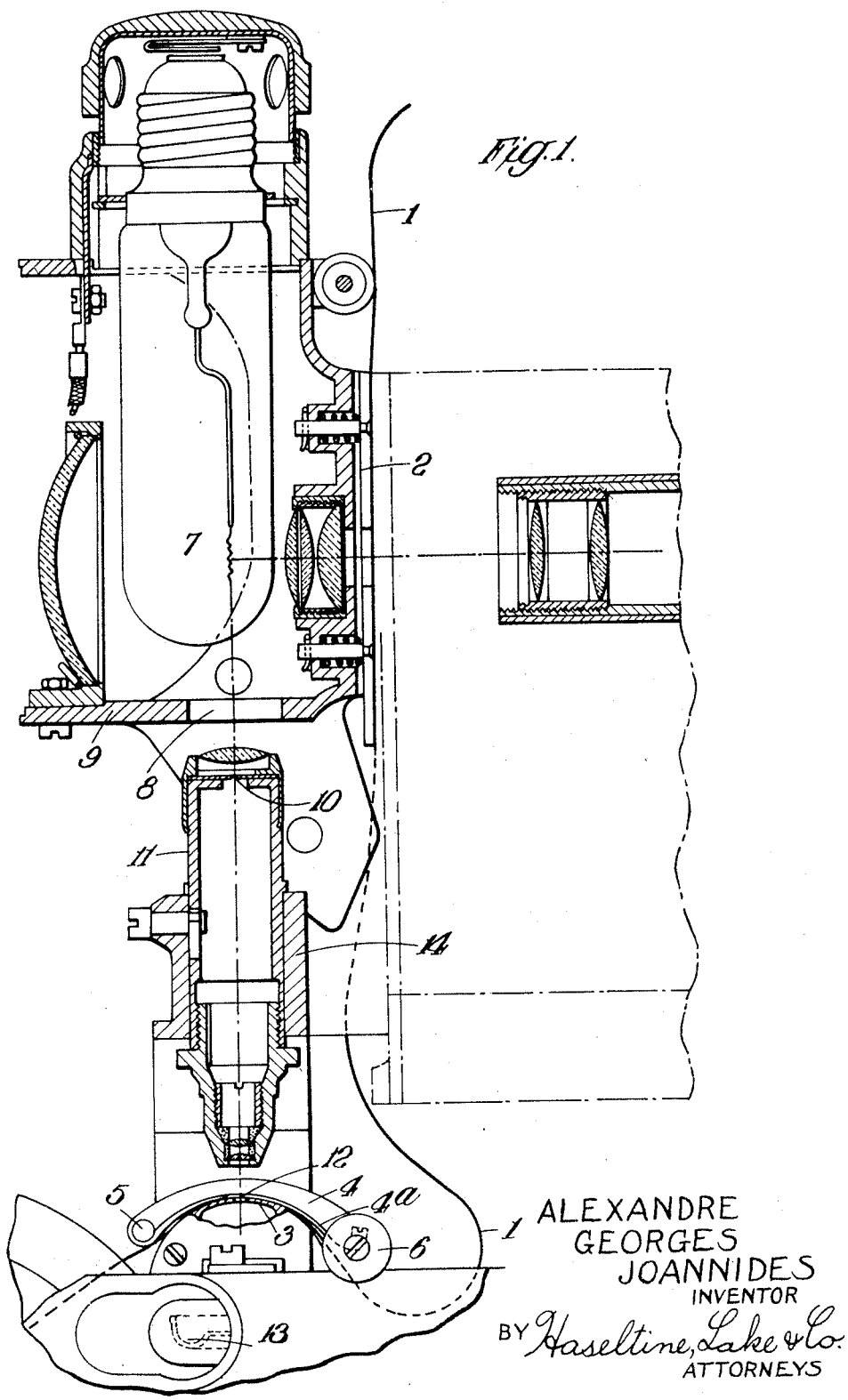

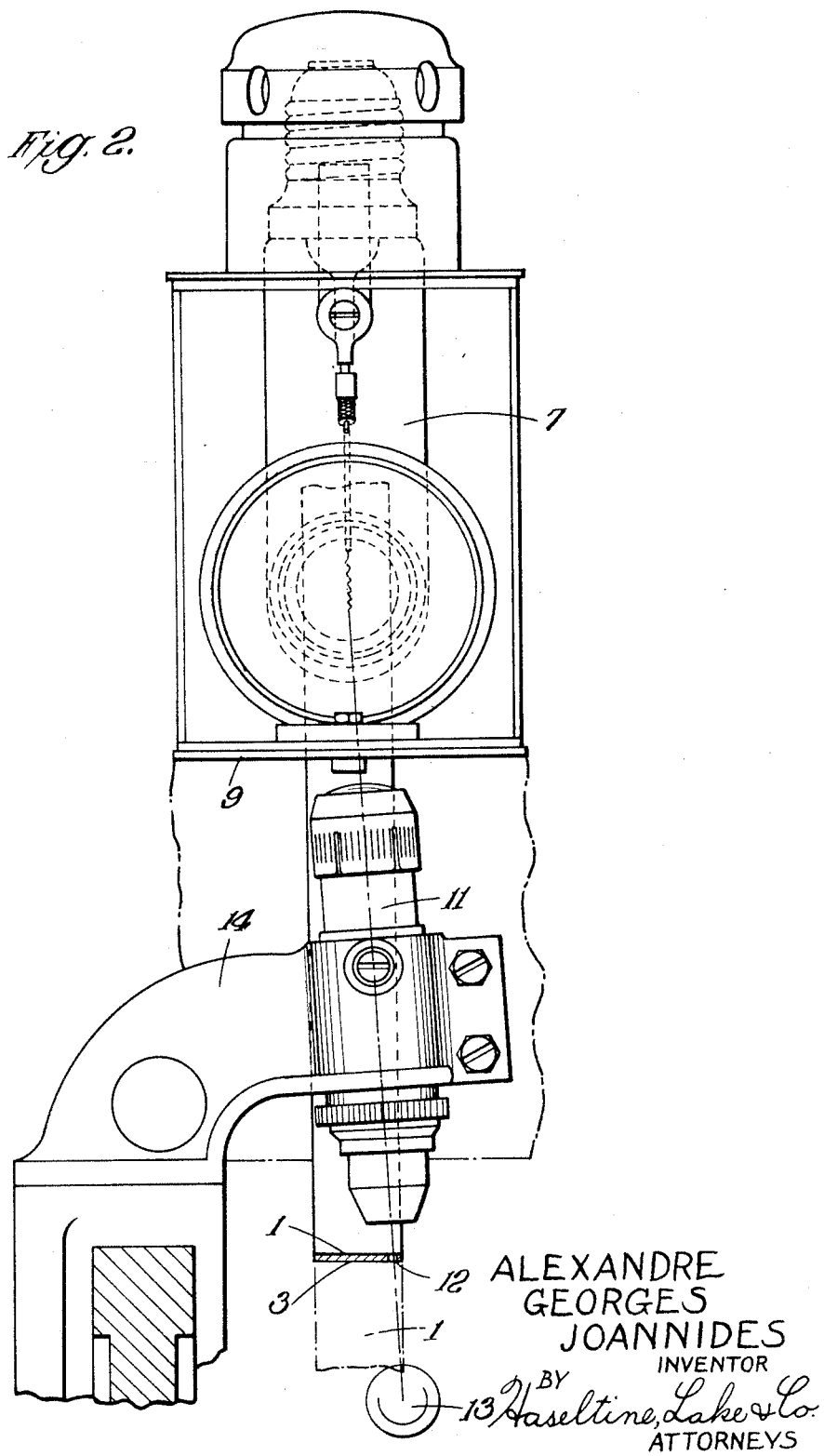

APPARATUS FOR READING SOUND ON CINEMATOGRAPH SOUND FILMS

Alexandre Georges Joannides, Paris, France, assignor to Societe Pour L'Exploitation Des Brevets, A. G. I., Paris, France Application May 19, 1933, Serial No. 671,796
In France September 15, 1932

4 Claims. (Cl. 179—100.3)

This invention relates to the reading of sound on cinematograph sound films. In apparatus for this purpose as hitherto generally constructed, a special lamp has been employed for exciting the photo-electric cell, the sound track being explored on the film at the moment when it passes over a guide against which it is held by means of a counter guide or by means of spring pressure.

It has also been proposed to employ the same source of light for the exploration of the sound track as that employed for projection of the image, but such apparatus as hitherto constructed has entailed the use of a complicated optical system employing a combination of lenses and prisms. In other words the same source of light fed the projection lamp directly but fed the sound reading device indirectly.

The chief object of the invention is to avoid the necessity for the use of a complicated optical system whilst employing the same source of light for exploring the sound track and for projecting the image onto the screen.

Apparatus for reading sound on cinematograph sound film according to the invention includes a reducing optical system through which a pencil of light rays from the projection lamp is directed onto the sound track, the axis of the reducing optical system being inclined slightly so that the pencil of light rays pass directly through the sound track.

In order to illuminate uniformly the aperture in the optical system by the projection lamp in the case of a projection lamp the filament of which is not in a position for the optimum illumination of the aperture, a bi-convex lens is arranged adjacent the aperture, throwing onto the aperture a parallel pencil of light rays.

Referring to the drawings:—

Figure 1 is a vertical longitudinal section of a portion of a cinematograph projector showing the invention applied thereto.

Figure 2 is a rear elevation of same partly in section.

In the construction illustrated the film 1 is unwound from a delivery spool (not shown) situated at the upper part of the apparatus, and after leaving an upper feed member (also not shown) enters the picture projection path or gate 2, the film being driven with an intermittent movement by means of claws in the usual way. The film then leaves the picture projection path and after forming a loop passes over a guide 3. The film is maintained in correct alignment with the guide by means of a member 4 pivoted at 5, and carrying at its opposite end a roller 6, the film being pressed into contact with the guide by means of a spring 4a associated with the member 4, and bearing upon the opposite side of the film to that carrying the sound track.

Upon leaving the reading guide, the film carried along by the speed of the lower delivery spool passes on to the shaft of a speed-regulating wheel, this wheel being driven by the film itself. On this smooth shaft, the film is not subjected to any lateral guidance, and this wheel and its shaft rotate freely between points. The film returns to the lower delivery spool of the actual projector and is then rewound on the lower spool.

The pencil of light rays emanating from the projection lamp 7 and intended for exploring the sound track pass downwardly through a hole 8 provided in the bottom of the lamp housing 9 and illuminate the aperture 10 situated at the upper end of the reducing optical system 11 which projects the image of the aperture by means of a suitable arrangement of lenses onto the sound track of the film situated just above a hole 12 formed in the guide, the pencil of light rays after passing through the sound track being directed onto a photoelectric cell 13 disposed directly beneath.

The sound track is situated at one side of the film, and in order that the axis of the reducing optical system shall be in a direct line with the filament of the projection lamp and the centre of the sound track the reducing optical system is inclined slightly out of the vertical position as shown in Figure 2, the photo-electric cell being also slightly off-set for this purpose.

The reducing optical system may be mounted upon the projector in any suitable manner and may conveniently be clamped in position within a bracket 14.

What I claim and desire to secure by Letters Patent of the United States is:—

1. In apparatus for reproducing sound from film having the sound track situated near one edge of the film and wherein the same source of light is simultaneously employed for directly exploring the sound track and directly projecting the image on to the screen, a projection lamp, a film guide disposed beneath said projection lamp, and a reducing optical system disposed between said projection lamp and said film guide and guiding through the same a pencil of light rays from the light source of the projection lamp in a direct line to the sound track of the film as said film passes over said film guide, and which reducing optical system is inclined slightly from the vertical into a lateral direction.

2. Apparatus for reproducing sound on film comprising a projection lamp, a film guide disposed beneath said projection lamp, said guide having a hole disposed beneath the sound track situated near one edge of the film, a photo-electric cell disposed beneath the hole in said guide, and a reducing optical system disposed between said projection lamp and said guide through which a pencil of light rays from the projection lamp can be directed onto the sound track, said reducing optical system being inclined slightly to enable the pencil of light rays from the projection lamp to pass directly through the sound track and through the hole in said guide and impinge on said photo-electric cell.

3. Apparatus for reproducing sound on film comprising a projection lamp, a housing containing said projection lamp and having an opening at its lower end through which light rays from the lamp can pass in a downward direction, a film guide disposed beneath said projection lamp, said guide having a hole disposed beneath the sound track situated near one edge of the film, a photo-electric cell disposed beneath the hole in said guide, and a reducing optical system disposed between said projection lamp and said guide through which a pencil of light rays from the projection lamp can be directed onto the sound track, said reducing optical system being inclined slightly to enable the pencil of light rays from the projection lamp to pass directly through the sound track and through the hole in said guide and impinge on said photo-electric cell.

4. Apparatus for reproducing sound on film comprising a projection lamp, a housing containing said projection lamp and having an opening at its lower end through which light rays from the lamp can pass in a downward direction, a film guide disposed beneath said projection lamp, said guide having a hole disposed beneath the sound track situated near the edge of the film, a photo-electric cell disposed beneath the hole in said guide, a member pivotally connected to said guide and bearing upon one edge of the film, a roller carried by said pivoted member for engaging the opposite edge of said film, a spring for pressing said film into contact with said guide, and a reducing optical system disposed between said projection lamp and said guide through which a pencil of light rays from the projection lamp can be directed onto the sound track, said reducing optical system being inclined slightly to enable the pencil of light rays from the projection lamp to pass directly through the sound track and through the hole in said guide and impinge on said photo-electric cell.

A. G. JOANNIDES.